United States Patent [19]

Oka

[11] Patent Number: 5,076,387
[45] Date of Patent: Dec. 31, 1991

[54] SADDLE TYPE VEHICLE HAVING A STORAGE RECEPTACLE

[75] Inventor: Yoshio Oka, Hermosa Beach, Calif.

[73] Assignee: Honda Giken Kogyo Kabushiki Kaisha, Tokyo, Japan

[21] Appl. No.: 545,753

[22] Filed: Jul. 2, 1990

Related U.S. Application Data

[63] Continuation of Ser. No. 337,060, Apr. 12, 1989, abandoned.

[51] Int. Cl.$^5$ .............................................. B62D 61/08
[52] U.S. Cl. .................................... 180/215; 296/37.1
[58] Field of Search ............... 180/215, 219, 210, 211, 180/252; 296/37.16, 37.1, 3, 198; 224/42.11, 42.31, 42.44

[56] References Cited

U.S. PATENT DOCUMENTS

| | | | |
|---|---|---|---|
| 4,300,706 | 11/1981 | Hendrick et al. | 224/31 |
| 4,325,562 | 4/1982 | Yamada et al. | 180/215 |
| 4,449,602 | 5/1984 | Dittman, Jr. | 180/215 |
| 4,531,606 | 7/1985 | Watanabe | 180/210 |
| 4,646,865 | 3/1987 | Imaizumi et al. | 180/215 |
| 4,719,984 | 1/1988 | Watanabe | 180/215 |
| 4,726,439 | 2/1988 | Iwao et al. | 180/219 |
| 4,744,432 | 5/1988 | Shibata et al. | 180/215 |
| 4,749,205 | 6/1988 | Takahashi et al. | 280/95 R |
| 4,800,980 | 1/1989 | Hideo et al. | 296/37.16 |
| 4,826,057 | 5/1989 | Yamada | 224/32 |

FOREIGN PATENT DOCUMENTS 59-128016 7/1984 Japan.

Primary Examiner—Andres Kashnikow
Assistant Examiner—Richard Camby
Attorney, Agent, or Firm—Irving M. Weiner; Joseph P. Carrier; Pamela S. Burt

[57] ABSTRACT

A saddle type, off-road vehicle is disclosed which comprises a frame, an engine mounted to the frame, a pair of rear wheels disposed on opposite sides of the frame, at least one front wheel, a seat supported on an upper portion of the frame, and a steering handle positioned forwardly of the seat. Each of the rear wheels has a larger diameter and a smaller lateral width than each of the front wheels. Additionally, the vehicle includes a relatively large storage receptacle is provided on the frame.

16 Claims, 2 Drawing Sheets

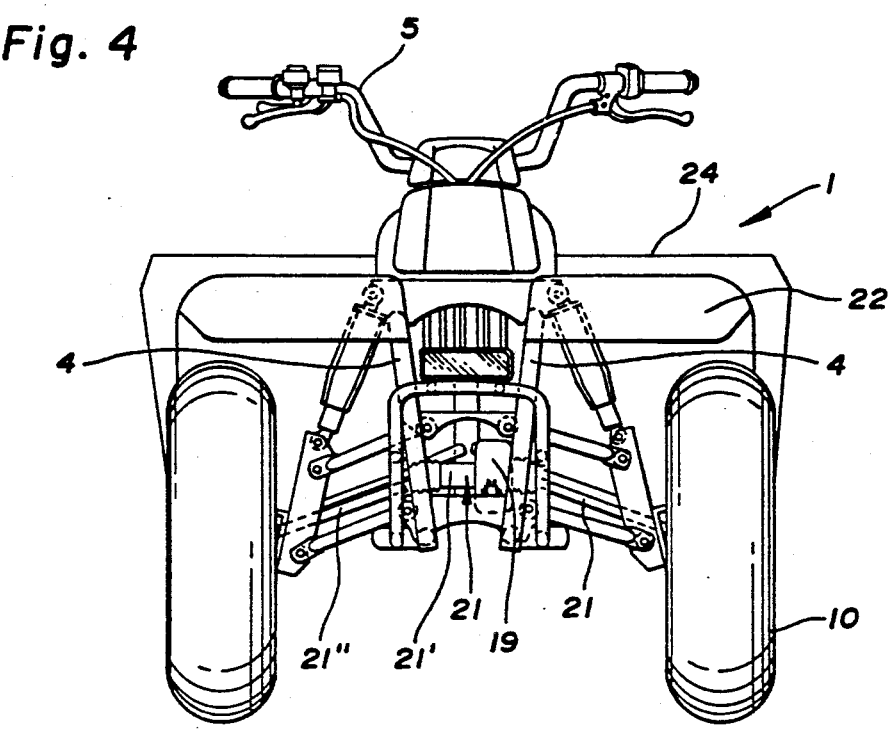
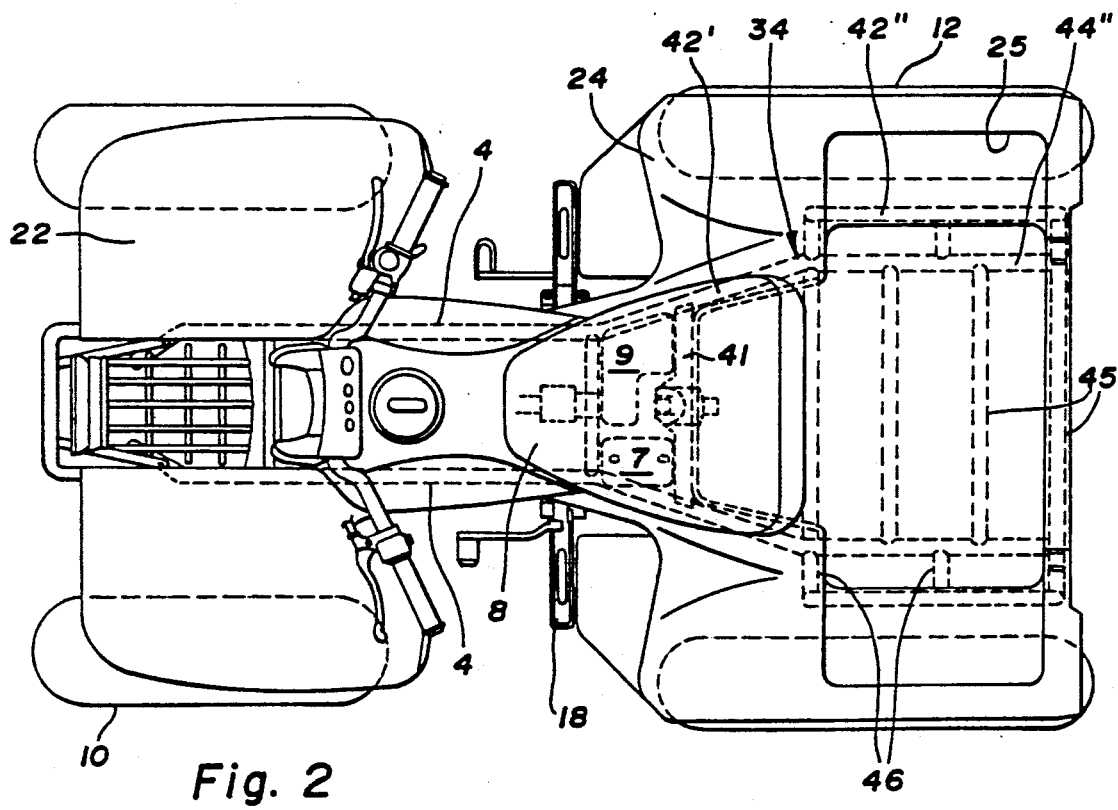

SADDLE TYPE VEHICLE HAVING A STORAGE RECEPTACLE

This is a continuation of application Ser. No. 337,060 filed Apr. 12, 1989 now abandoned.

BACKGROUND OF THE INVENTION

1. Field of the Invention

The present invention relates to a saddle type, off-road vehicle having a storage receptacle provided on a rear portion thereof. More particularly, the present invention relates to saddle type, off-road vehicle having a saddle shaped seat similar to a motorcycle, a pair of rear wheels and a pair of front wheels each provided with a low pressure tire, a frame having increased strength and rigidity, and a relatively large storage receptacle provided on a rear portion of the vehicle.

2. Description of the Relevant Art

There are many known saddle type, off-road vehicles, including many three and four wheeled vehicles. These known vehicles are normally equipped with balloon type, low pressure tires for traveling through and over many different terrains. Further, these known vehicles have been used for not only recreational purposes, but also farm activities because of their great ability to travel over many different terrains.

In this regard, however, most of the known saddle type vehicles do not have a storage receptacle for carrying work loads and the like. In slight contrast to the general, complete absence of storage receptacles, two known saddle type, three-wheeled vehicles are disclosed in U.S. Pat. No. 4,325,562 and Japanese Patent Publication No. 59-128016, respectively, each of which includes a container positioned rearwardly of a driver's seat for containing loads such as items of clothing, a lunch, small pieces of luggage, etc. The container disclosed in U.S. Pat. No. 4,325,562 is rather small and, correspondingly is capable of containing only small objects. The container disclosed in Japanese Patent Publication No. 59-128016 is larger than that disclosed in the U.S. patent, but to achieve this increased size the receptacle is positioned very closely above the vehicle's rear axle, as shown in FIG. 4 of the Publication. Although the Publication does not disclose how the container is actually supported on the vehicle or how the container cooperates with the rear axle, the depicted close positioning is normally undesirable. Particularly, if the container is supported separately from the rear axle, it would tend to substantially interfere with vertical, bouncing movements of the rear axle, and if the container is supported together with the rear axle it (as well as objects placed therein) would be subjected to excessive bouncing and vibrations.

The present invention has been developed to overcome the above-discussed problems and disadvantages of known saddle type, off-road vehicles.

SUMMARY OF THE INVENTION

It is an object of the present invention to provide a saddle type, off-road vehicle having a relatively large storage receptacle provided thereon for conveniently storing and transporting large heavy loads.

It is another object of the present invention to provide such an off-road vehicle in which the storage receptacle is disposed at a relatively low position on the vehicle so that it does not substantially increase the overall size of the vehicle in relation to other such vehicles which do not include storage receptacles.

Still another object of the present invention is to provide such an off-road vehicle which has high structural strength and rigidity, and is well suited for use in transporting large heavy loads and other demanding work related activities.

According to the present invention a saddle type, off-road vehicle is provided which comprises a frame, an engine supported by the frame, a pair of rear wheels disposed on opposite sides of the frame, at least one front wheel, a seat supported on an upper portion of the frame, and a steering handle positioned forwardly of the seat. Each of the rear wheels has a larger diameter and a smaller lateral width than each of the front wheels. Additionally, the vehicle further includes a relatively large storage receptacle which is disposed at least partially between the rear wheels.

The above and other objects, features and advantages of the present invention will become apparent from the following description when taken in conjunction with the accompanying drawings which illustrate a preferred embodiment of the invention by way of example.

BRIEF DESCRIPTION OF THE DRAWINGS

FIG. 2 is a plan view of the vehicle shown in FIG. 1.

FIG. 4 is a front view of the vehicle shown in FIG. 1.

DETAILED DESCRIPTION OF THE PREFERRED EMBODIMENT

Figure 1:
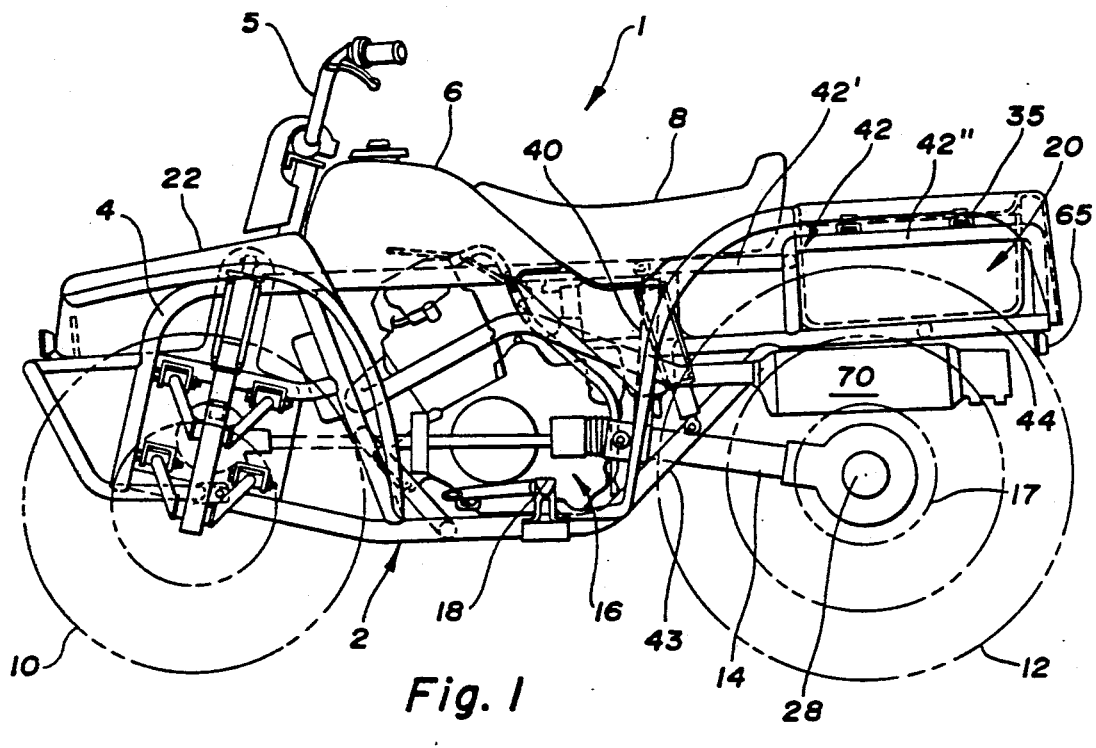
FIG. 1 is a side view of a saddle type, off-road vehicle according to the present invention.

Referring to FIGS. 1-4, there is shown a saddle type, off-road vehicle 1 according to the present invention. The vehicle includes a frame 2 which is generally comprised of a pair of longitudinally extending, laterally spaced sections 4, and a plurality of cross members connecting and reinforcing the laterally spaced sections 4. The frame 2 supports a steering handle 5, a fuel tank 6, a battery 7, a rider's seat 8, an air cleaner unit 9, a pair of front wheels 10 (each provided with a balloon type, low pressure tire) which are steered through the steering handle 5, an engine cooling means 11, a rear swing arm assembly 14, a drive unit 16 including an internal combustion engine and a transmission means for transferring rotative power to the front wheels 10 and to a pair of rear wheels 12 (each of which is also provided with a balloon type, low pressure tire), a pair of foot supports 18, a front fender 22 covering the front wheels 10, and a rear fender 24 covering the rear wheels 12, and a relatively large storage receptacle 20.

As depicted, the transmission means of the drive unit 16 can include a pair of drive shafts which drive front and rear axles 21, 28, respectively. The rear axle 28 is vertically swingably supported by the frame 2 through the rear swing arm assembly 14, which is pivotally connected to the frame. Two known swing arm assemblies for supporting a shaft driven axle are disclosed in U.S. Pat. Nos. 4,646,865 and 4,749,205, respectively. Referring to FIG. 4, the front axle 21 includes a central portion 21' which is non-pivotally supported on a front end of the frame 2, and a pair of side sections 21", each of which is pivotally connected between the central section 21' and one of the front wheels 10. The front axle 21 has a differential 19 associated therewith, while the rear axle 28 has a differential 17 associated therewith. It will be understood that although a shaft driven, four-wheel-drive transmission means is disclosed in FIGS. 1-4, other known types of transmission means could be used in vehicles according to the present invention. For example, a vehicle could have only rear driven wheels and could have a chain and sprocket type transmission means driving the rear wheels.

As shown in FIGS. 1 and 4, each of the front wheels is preferably independently supported on the front end of the frame 2 by appropriate suspension means, such as the double wishbone type suspension depicted.

As shown in FIGS. 1-4, each of the rear wheels 12 (including the tires provided thereon) has a larger diameter than the front wheels 10 (including the tires provided thereon), but each of the rear wheels 12 also has a smaller lateral width than the front wheels. This arrangement is advantageous because it permits the storage receptacle 20, which is partially disposed between the rear wheels 12, to have a relatively large size and to be positioned at a relatively low position at a rear end of the vehicle without interfering with swinging or bouncing movements of the rear axle 28 and the rear swing arm assembly 14.

As shown in FIG. 2, the tread between the rear wheels 12 may be slightly greater than the tread between the front wheels 10. Most preferably, each of the wheels 10, 12 will have substantially the same volume or amount of air in the tire provided thereon so that each wheel has the same load carrying capability.

Figure 3:
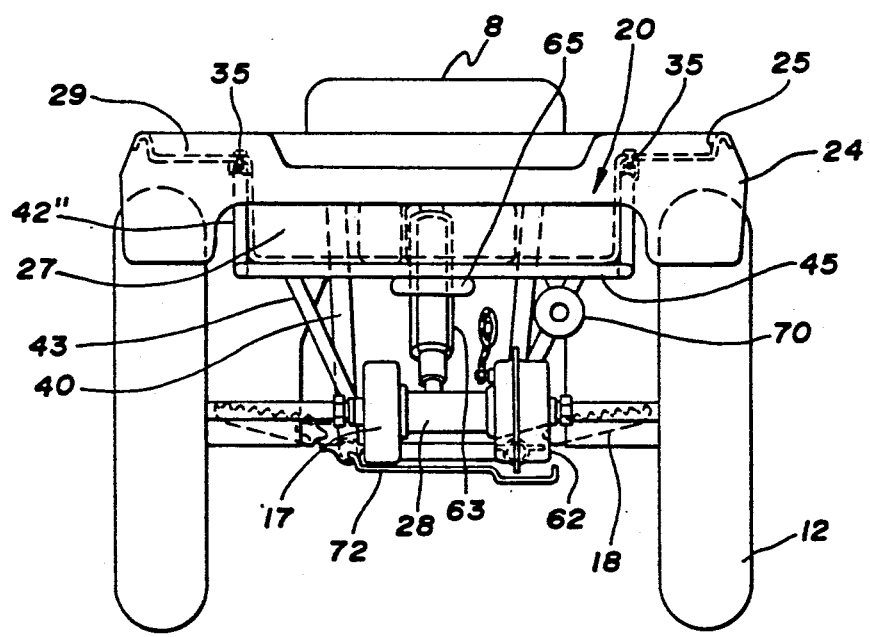
FIG. 3 is a rear view of the vehicle shown in FIG. 1.

Referring to FIGS. 1-3, each of the sections 4 of the frame 2 preferably includes a major part which is generally loop shaped when viewed from the side, and a rear part which extends integrally rearwardly from the major part. The major loop-shaped part of frame 2 terminates at an intermediate portion of the vehicle beneath the seat 8. Particularly, a rear end of the major part of each lateral section 4 includes a substantially vertically extending member 40 which connects upper and lower portions of the section. A laterally extending cross member 41 connects the upper ends of the members 40. In relation to the major parts of the sections, the rear part of each section preferably includes an upper portion 42, a lower portion 43, and an intermediate portion 44. As best shown in FIGS. 1-3, each of the upper portions 42 includes a front part 42' which extends rearwardly and outwardly from an upper portion of a corresponding lateral section 4 of the frame, and a rear part 42" which is generally constructed as a vertically extending, rectangular ring which projects laterally outwardly of the front part 42' and the corresponding intermediate or lower rear portion 44. Preferably, the rear part 42" will extend rearwardly to a position near a rear end of the rear wheels 12. As best shown in FIGS. 1 and 3, each of the lower portions 43 preferably extends upwardly, rearwardly and outwardly from a lower portion of a major part of the corresponding section 4 to engage a corresponding one of the intermediate portions 44. The intermediate portions 44 include front parts which are disposed substantially beneath the front parts 42' of the upper portions and have front ends thereof connected to intermediate portions of the rear end members 40 of the major parts of the sections 4, 4, respectively, and rear parts 44" which extend horizontally rearwardly to a rear end of the vehicle. The rear part of each section 4 also includes a plurality of laterally extending members 45, 46 which interconnect the rear parts 42", 44" of the upper and intermediate portions. The depicted construction of the frame is preferred because it has a relatively high strength and rigidity, and because the rear frame is particularly well suited for carrying large heavy loads at the rear end of the vehicle.

Although the depicted frame structure is preferred, it will be understood that vehicles according to the present invention could have differently constructed frames. For example, each of the sections 4 may simply comprise a loop shaped part, and the storage receptacle may be supported on upper or rear surfaces of the loop shaped parts. Further, each of the sections 4 may not be loop shaped, but rather may simply comprise a longitudinally extending member formed from cast aluminum or the like.

As shown in FIGS. 1-3, the rear fender 24 and the storage receptacle 20 are preferably constructed or formed as an integral unit. Such integral unit is preferably composed of synthetic materials such as moldable plastics, fiberglass, etc., but may be constructed of other conventional materials such as sheet metal. The integrally constructed rear fender and storage receptacle unit is advantageous for many reasons, including relatively low manufacturing costs, increased structural strength and rigidity, attractive appearance, etc.

The storage receptacle 20 preferably has a large opening 25 defined in the upper surface thereof such that the receptacle's upper end is substantially completely open, and whereby objects can be readily placed into and taken out of the storage receptacle. As depicted, the rear fender 24 preferably extends laterally outwardly and then downwardly around substantially the full perimeter (the full perimeter excluding a small section at the front of the receptacle beneath the rider's seat) of the upper end of the storage receptacle, thereby assuring that the upper end of the receptacle is sufficiently strong and rigid. As depicted, the storage receptacle 20 preferably includes a lower section 27 extending from a rear end of the vehicle to a position beneath an intermediate portion of the seat 8, and an upper section 29 which extends laterally from an upper end of the lower section on both sides thereof such that a stepwise structure is defined between the upper and lower sections. Similarly, a stepwise structure is defined between upper section 29 and the rear fender 24. If desired, such stepwise structures could be sloped inwardly of the receptacle. Note that a portion of the lower section 27 is disposed laterally between the rear wheels 12, while a portion of the upper section 29 is disposed above each of the rear wheels 12, and that the storage receptacle is fitted to the rear parts of the frame 2. One or more drain holes will preferably be provided in a bottom surface of the lower section 27, while removable covers will be provided for covering the holes when desired.

As best depicted in FIG. 1, the storage receptacle 20 is preferably located above the rear axle 28. Such location favorably increases the rigidity of the storage receptacle as disposed on the vehicle 1. Although the bottom surface of the lower section 27 is depicted as extending substantially horizontally, it may be inclined forwardly downwardly if so desired. This forward inclination would reduce the possibility of the bottom surface interfering with vertical swinging movements of the rear axle 28 and the rear swing arm assembly 14. If the bottom surface is forwardly inclined, the drain holes 23 would be provided at a front end thereof.

Although not shown, the vehicle 1 could include a lid that would be readily securable over and removable from the open upper end of the storage receptacle 20. Such a lid would preferably only cover a rear portion of the receptacle inasmuch as the seat 8 covers a front portion of the lower section 27. If desired, the lid would be pivotally attached to the storage receptacle 20 or the rear fender 24 through an appropriate hinge means, and a securing means including a latch mechanism and a lock would preferably be provided for securing the lid in a closed position. Additionally, a removable partition plate may be provided in the storage receptacle 20 to separate the lower and upper sections 27, 29 when desired. Preferably such a partition plate would be simply supported on the laterally extending portions of the upper section 29 and would cover at least a rear portion of the lower section 27. Again, the removable partition plate feature is not shown in the drawings.

As best shown in FIG. 3, the storage receptacle 20 is connected for support to the rear parts of the frame 2 at connections 35. More particularly, upper rear parts 42" of the frame extend beneath the stepwise structure between the lower and upper sections 27, 29 of the storage receptacle, while the bottom wall of the upper section 29 is connected to the upper rear parts 42" at connections 35. Further, if additional support for the storage receptacle is desired, a bottom wall of the lower section 27 of the storage receptacle can be secured to the intermediate portions 44 or to the laterally extending members 45 of the frame through appropriate connections.

Referring to FIGS. 1-3, a suspension means for the rear wheels 12 includes the rear swing arm assembly 14 and a cushioning unit 63. As depicted, the cushioning unit 63 is preferably of a conventional type including a hydraulic damper and a coil spring provided in surrounding relation to the hydraulic damper. The cushioning unit 63 is positioned below the rider's seat 8, having a lower end thereof pivotally connected to a laterally extending member of the rear swing arm assembly 14 and having an upper end thereof pivotally connected to a bracket extending downwardly from the cross member 41 of the frame 2. In this regard, and specifically referring to FIG. 2, it will be noted that a junction between the major and rear parts of the frame 2 is substantially V-shaped opening rearwardly when viewed in plan, and that the upper portion of the cushioning unit 63 extends upwardly to an intermediate portion of the V-shaped junction.

Although not shown, the vehicle's rear suspension may be modified by connecting the lower end of the cushioning unit 63 to the swing arm assembly 14 through a link arrangement. Such a link arrangement would include a first link pivotally connected at a rear end thereof to a laterally extending member of the swing arm assembly 14, and a second link pivotally connected between a front end of the first link and a cross member extending laterally between lower portions of the major parts of lateral sections 4 of the frame 2. The lower end of the cushioning unit 63 would be pivotally connected to the pivoting connection between the first and second links, and would extend below the swing arm assembly 14 to increase the stroke of the cushioning unit. Also, the vehicle's rear suspension may be modified to include a pair of laterally spaced cushioning units 63, each having a lower end thereof pivotally connected to the rear axle 28 and having an upper end thereof pivotally connected to a corresponding one of the upper rear portions 42 of the frame, for example. Again this modification is not shown in the drawings.

Further, it will noted that the battery 7 and the air cleaner unit 9 are disposed on opposite sides of the upper end of the cushioning unit 63 beneath the rider's seat 8. In this arrangement, the battery 7 and air cleaner 9 will preferably be suspended from upper portions of the frame 2 through appropriate brackets and fastening means. Further, the rider's seat 8 will have a hinge mechanism and a latch mechanism associated therewith, whereby the latch mechanism can be selectively released and the seat can be selectively swung forwardly or sidewardly to provide ready access to the battery, the air cleaner unit, the cushioning unit, and other components disposed beneath the seat. This arrangement efficiently utilizes space beneath the rider's seat, to thereby reduce the overall size of the vehicle and improve the vehicle's appearance.

Vehicle 1 also includes a muffler 70 which, in the depicted embodiment, extends longitudinally of the vehicle on one side thereof. The muffler 70 will preferably be supported by one of the rear intermediate portions 44 of the frame 2 through an appropriate bracket (not shown). As depicted, the muffler 70 is preferably disposed below the intermediate portions 44 of the rear frame 34, but substantially above the rear axle 28 so that it will not interfere with vertical, swinging movements of the rear axle. A braking mechanism 62 is provided on the rear axle 28 for cooperating therewith, while a rear brake light 65 depends from a lower rear end of the optional portion 44 of the rear frame. In this regard, it will noted that the braking mechanism 62 is provided on an opposite side of the rear axle from the differential 17, and that both the braking mechanism 62 and the differential 17 are disposed in offset relation to the muffler 70. Such an arrangement assures that the muffler 70 will not interfere with the differential and the braking mechanism when the rear axle is vertically moved, and also assures a better weight distribution or balancing of components at the rear end of the vehicle.

As shown in FIG. 3, a lower guard member 72 may be provided below the central part of the rear axle 28 for protecting the axle, the differential 17 and the braking mechanism 62 from engagement with the ground, rocks, or other foreign matter. The guard 72 will be secured to the swing arm assembly 14 or to the rear axle 28 in an appropriate manner.

Although there has been described what is at present considered to be the preferred embodiment of the invention, it will be understood that the invention can be embodied in other specific forms, and that many changes and modifications can be made to the above-described structures without departing from the spirit or essential characteristics thereof. The depicted embodiment is, therefore, to be considered in all aspects as merely illustrative, and not restrictive. The scope of the invention is indicated by the appended claims rather than the foregoing description.

I claim:
1. An off-road vehicle, comprising:
   a frame;
   an engine supported by the frame;
   at least one front wheel;
   a pair of rear wheels disposed on opposite sides of the frame;
   said front and rear wheels having low pressure, balloon type tires provided thereon;
   a rear fender positioned above the rear wheels;
   the rear wheels having a larger diameter than each said front wheel;
   a storage receptacle adapted to selectively store articles therein, said storage receptacle being provided at a rear portion of the vehicle and supported by a rigidly fixed portion of said frame;

said storage receptacle and said rear fender being integrally molded as a single unitary member;

seat means;

an upper surface of said storage receptacle being disposed at a level below an upper surface of said seat means; and said storage receptacle having a lower portion positioned between said rear wheels and extending substantially fully across a lateral width between the rear wheels, and an upper portion extending laterally outwardly from the lower portion over the rear wheels.

2. A vehicle according to claim 1, including:

a pair of front wheels provided with said balloon type tires disposed on opposite sides of said frame; and a tread of said rear wheels is at least as large as a tread of said front wheels.

3. A vehicle according to claim 1, further including:

a rear swing arm assembly having a forward portion thereof swingably connected to said frame and a rear portion thereof supporting a rear axle to which said rear wheels are connected, such that said rear axle and said rear wheels are vertically swingable relative to said frame;

said storage receptacle being rigidly connected to said frame such that a bottom wall of said storage receptacle is positioned above said rear axle and said storage receptacle is rigidly supported above said swingable rear axle.

4. A vehicle according to claim 1, wherein:

a bottom wall of said storage receptacle is inclined forwardly downwardly; and said storage receptacle has at least one drain hole defined in a lower inner surface thereof.

5. A vehicle according to claim 1, wherein:

said rear fender extends integrally outwardly and downwardly around at least side and rear upper perimeter portions of said storage receptacle.

6. A vehicle according to claim 1, wherein:

said integral storage receptacle and rear fender unit is plastic.

7. A vehicle according to claim 1, wherein:

said storage receptacle is supported by a rear part of said frame, said rear frame part including an upper portion extending substantially to the rear end of said vehicle at a level below an upper surface of said seat, and a lower portion extending substantially to the rear end of said vehicle between said rear wheels.

8. A vehicle according to claim 7, wherein:

a bottom wall of said storage receptacle is positioned above said lower rear portion of said frame.

9. A vehicle according to claim 7, wherein:

said an upper portion of said storage receptacle is supported by said upper rear portion of said frame.

10. A vehicle according to claim 1, wherein:

said lower portion of said storage receptacle extends substantially from a rear end of said vehicle to a position below and intermediate portion of said seat.

11. A vehicle according to claim 3, further including:

a muffler; and said muffler is positioned beneath said storage receptacle.

12. A vehicle according to claim 11, wherein:

said muffler is positioned above the rear axle.

13. A vehicle according to claim 1, wherein:

a rear part of said frame is wider than said seat and supports said storage receptacle.

14. A vehicle according to claim 1, wherein:

a rear part of said frame includes upper and lower portions; and said storage receptacle is fitted to the upper and lower portions of the rear part of said frame.

15. A vehicle according to claim 1, wherein:

said storage receptacle extends from a rear end of the vehicle to at least a rear end of said seat.

16. A vehicle according to claim 1, wherein:

said unitary member is plastic; and said rear wheels have a smaller lateral width than said front wheel.

* * * * *

UNITED STATES PATENT AND TRADEMARK OFFICE
CERTIFICATE OF CORRECTION

PATENT NO. : 5,076,387
DATED : December 31, 1991
INVENTOR(S) : Yoshio Oka It is certified that error appears in the above-identified patent and that said Letters Patent is hereby corrected as shown below:

Column 1, line 43, change "patent" to -- Patent --.
Column 5, line 66, change "it will noted" to -- it will be noted --.
Column 6, line 26 and 27, change "it will noted" to -- it will be noted--.

Signed and Sealed this

Thirtieth Day of March, 1993

*Attest:*

STEPHEN G. KUNIN

*Attesting Officer*     *Acting Commissioner of Patents and Trademarks*